M. RAHR, Jr.
AUTOMOBILE CURTAIN.
APPLICATION FILED JAN. 8, 1917.
1,249,828.
Patented Dec. 11, 1917.
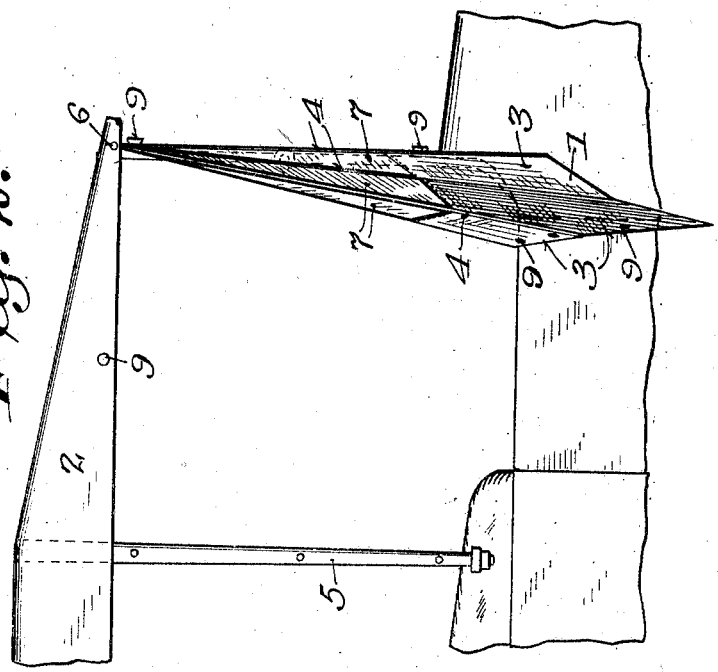
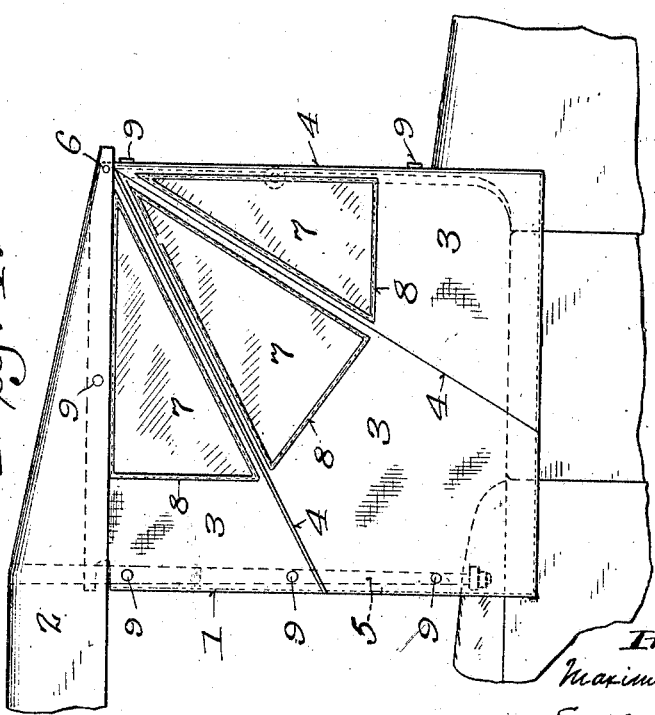
Inventor
Maximilian Rahr Jr.
By Entin & Wheeler
Attorneys

UNITED STATES PATENT OFFICE.

MAXIMILIAN RAHR, JR., OF MANITOWOC, WISCONSIN.

AUTOMOBILE-CURTAIN.

1,249,828.  Specification of Letters Patent.  Patented Dec. 11, 1917.

Application filed January 8, 1917. Serial No. 141,119.

*To all whom it may concern:*

Be it known that I, MAXIMILIAN RAHR, Jr., a citizen of the United States, residing at the city of Manitowoc, county of Manitowoc and State of Wisconsin, have invented new and useful Improvements in Automobile-Curtains, of which the following is a specification.

My invention relates to improvements in curtains for automobiles and the like.

The object of my invention is to provide a curtain that is so creased that it is adapted, when released at its upper side, and at one of its upper corners, to drop in a folded position, diverging outwardly and downwardly from such upper corner, with each of the folded sections thereof diverging downwardly and outwardly, whereby the door of the vehicle to which it is attached may be readily opened and closed, and a person may pass into or out of such vehicle without danger of breaking the curtain or the transparencies located in any of the several sections thereof.

My invention is further explained by reference to the accompanying drawing, in which—

Figure 1 represents a portion of the upper front end of an automobile provided with one of my foldable curtains, shown as it appears in its unfolded position thereon.

Fig. 2 is a similar view of an automobile to that shown in Fig. 1, showing my curtain in its folded position as it appears when suspended from one of its front upper corners preparatory to opening the vehicle door.

Like parts are identified by the same reference numerals throughout both views.

1 represents one of my curtains as it appears attached to one side of the front end of an automobile cover 2. It will be understood that a similar curtain to that shown in Fig. 1 is also adapted to be supported from the opposite side of the vehicle. Each of the curtains 1 is preferably subdivided into a plurality of sections 3, and are provided with a plurality of seams and creases 4, whereby the same as soon as released from the top 2 is dropped in the folded position shown in Fig. 2, whereby it is suspended from the cover 2 by a button 6, or by any equivalent means. 7 represents a plurality of transparent sections which are secured to the curtain by series of stitches 8, in the ordinary manner.

While I have shown the curtain subdivided by a plurality of creases or foldable sections, it is obvious that the number of such sections may be increased or diminished. It will, however, be understood that in all cases such curtain is adapted to be suspended from one of its upper corners, as indicated in Fig. 2. The curtain 1 is adapted to be retained in place in the extended position, shown in Fig. 1, by a plurality of buttons 9, or by any equivalent device. It will, of course, be understood that the construction of the automobile or other vehicle to which my curtain is attached is entirely irrelevant.

It will be understood that when the door of the automobile is hinged at its front edge the curtain is made, as shown in the accompanying sketch. When, however, the door is hinged at its opposite edge and swings rearwardly then the curtain is adapted to be suspended from its rear upper corner instead of its front upper corner, and said curtain is constructed accordingly so that when it is released it will fold rearwardly, and it will be suspended from its rear upper corner instead of its front upper corner, as shown in Fig. 2.

Having thus described my invention what I claim as new and desire to secure by Letters Patent, is:—

1. In a device of the described class, the combination with a vehicle top, of a curtain formed of a plurality of diverging sections secured together, means for securing said sections in an extended position, and means for holding said several sections in their folded position.

2. In a device of the described class, the combination with a vehicle top, of a curtain formed of a plurality of diverging sections, each section being provided with a transparent member secured therein by a series of stitches, means for securing said sections in an extended position, and means for holding said several sections in their folded position.

3. In a device of the described class, the combination with a vehicle top, of a curtain formed of a plurality of diverging sections, each section being provided at its upper end with a transparent member secured therein by a series of stitches, means for securing said sections in an extended position, and means for holding said several sections at one of their corners in their folded position with relation to such vehicle.

In testimony whereof I affix my signature in the presence of two witnesses.

MAXIMILIAN RAHR, Jr.

Witnesses:
O. C. WEBER,
JAS. B. ERWIN.